D. B. CALDWELL.
Straw Cutter.
No. 29,463.
Patented Aug. 7, 1860.
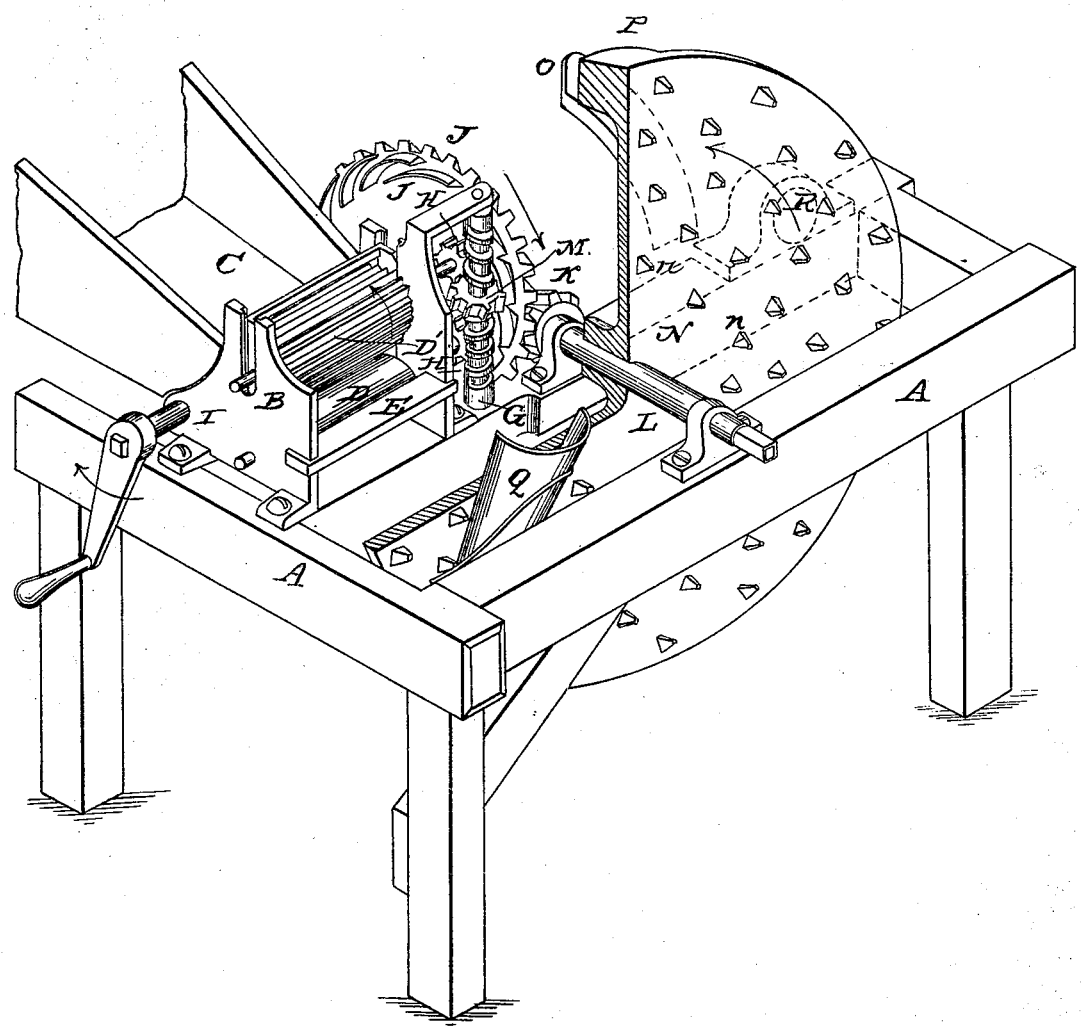
WITNESSES
INVENTOR
D. B. Caldwell
per Knight Brothers
Attys

UNITED STATES PATENT OFFICE.

DAVID B. CALDWELL, OF CINCINNATI, OHIO.

STRAW-CUTTER.

Specification of Letters Patent No. 29,463, dated August 7, 1860.

*To all whom it may concern:*

Be it known that I, DAVID B. CALDWELL, of Cincinnati, Hamilton county, Ohio, have invented certain new and useful Improvements in Straw-Cutters; and I do hereby declare the following to be a full and exact description thereof, reference being had to the accompanying drawings, making part of this specification.

My invention consists, first, in a peculiar device for driving the straw feeding rollers. Second, in an arrangement of cutting and feeding, gearing, by which different speeds can be given to the machine by a simple change in the point of gearing, to which the power is applied.

In the accompanying drawings A, is the frame of the machine, B, the straw cutting box, and C, the hopper or feeding trough of the same.

D, D', are straw feeding rollers and E, an adjustable cutting face.

G, is a right and left screw, journaled vertically in the frame, and geared in the manner shown into the pinions H, H, on the feed rollers. This screw, in rotating, turns the feed rollers in opposite directions as desired.

I, is a shaft journaled across the frame and carrying a peculiarly constructed gear wheel J. Bevel teeth are formed on the outside of this wheel adapted to take into bevel pinion K, on shaft L, and on the inner side of the wheel a number of short curved projections *j*, are formed eccentric to the wheel, and adapted to gear into, and produce when in motion, a rotation of pinion M, secured to screw G. Projections *j*, pinion M, and screw G, are adapted to give the requisite slow motion to the feed rollers, and are devised to dispense with the multiplicity of gearing usually employed for the purpose. The outside cogs of wheel J, gear into the small pinion K, of a shaft L, carrying a plate N, to which the straw cutting knife O, is attached. The knife O, is secured to the projection P, of plate N, so as to work in contact with, and present its edge obliquely to, the cutting face E, so as to effect a clean draw cut of the straw. The plate N, is provided as shown with a number of projections *n*, devised in connection with the spring feeder Q, to shell corn. The corn is fed in at the feeder Q, which is set obliquely in the frame, so that the corn in its passage through, may be rotated and completely shelled by the action of the projections *n*. The upper cut of the knife O, may be used for "shucking" corn, a suitable socket R, (shown in dotted lines), being provided, and secured to the frame, for receiving the ears of corn. The driving power can be applied either at shaft I, or shaft L, the effect produced in power and speed by the respective applications differing, as the diameters of wheel J, and pinion K. The upper feed roller D', is made to slide vertically in the frame and provided with the usual pressure spring or springs.

I claim as new and of my invention—

1. The combination and arrangement of the gearing J *j* M G for operating the feed rollers substantially as set forth.

2. The specific arrangement of shafting I, L, and gearing J, K, by which different speeds can be given to the working parts of the machine by a change of the point of application of power as described.

In testimony of which invention, I hereunto set my hand.

DAVID B. CALDWELL.

Witnesses:
GEO. H. KNIGHT,
R. WOLFINGTON.